(12) United States Patent
Chen

(10) Patent No.: US 9,383,034 B2
(45) Date of Patent: Jul. 5, 2016

(54) FOUR-FUNCTION ANTI-WATER HAMMER AIR VALVE SET

(76) Inventor: Yifei Chen, Shenzhen (CN)

( * ) Notice: Subject to any disclaimer, the term of this patent is extended or adjusted under 35 U.S.C. 154(b) by 108 days.

(21) Appl. No.: 14/349,067

(22) PCT Filed: May 31, 2012

(86) PCT No.: PCT/CN2012/000751
§ 371 (c)(1),
(2), (4) Date: Apr. 1, 2014

(87) PCT Pub. No.: WO2013/029332
PCT Pub. Date: Mar. 7, 2013

(65) Prior Publication Data
US 2014/0251449 A1 Sep. 11, 2014

(30) Foreign Application Priority Data
Aug. 30, 2011 (CN) .......................... 2011 1 0253264

(51) Int. Cl.
*F16K 24/06* (2006.01)
*F16K 47/02* (2006.01)
(Continued)

(52) U.S. Cl.
CPC ............... *F16K 47/02* (2013.01); *F16K 24/046* (2013.01); *F16K 24/06* (2013.01); *F16L 55/055* (2013.01); *F16L 55/07* (2013.01); *Y10T 137/2627* (2015.04)

(58) Field of Classification Search
CPC ......... F16K 47/02; F16K 17/01; F16K 17/12; F16K 24/04; F16K 24/042; F16K 24/044; F16K 24/046; F16K 24/048; F16K 24/06; F16K 31/14; F16K 31/18; F16K 31/20; F16K 31/22; F16K 31/24; F16L 55/07; F16L 55/055; E03F 5/08; Y10T 137/3099; Y10T 137/3294; Y10T 137/3331; Y10T 137/7897

USPC .................................. 137/202, 217, 218, 526
See application file for complete search history.

(56) References Cited

U.S. PATENT DOCUMENTS

| 1,327,693 | A | * | 1/1920 | Bewan | .................... E03B 11/06 137/381 |
| 1,336,280 | A | * | 4/1920 | Carroll | .................... E03C 1/122 137/526 |

(Continued)

*Primary Examiner* — Kevin Murphy
*Assistant Examiner* — Ian Paquette

(57) ABSTRACT

Disclosed is a multifunctional anti-surge three orifices air valve set, comprising a negative pressure admitting valve (1), a small volumes release valve (2) and a mid-high rate venting valve (3) as well as a control isolating valve (4); the mid-high rate venting valve (3) is connected to the top of the negative pressure admitting valve (1) via aeration tube and the control valve, the two orifices being arranged separately rather than being common to each other, in order on the one hand to be selected individually to fulfill respectively the requirements for two different flow rates or speeds or calibers in a mid-high rate venting and a high-rate admitting, and on the other hand to conduct a composite admitting, at a negative pressure, of both flows of admitting air to complement each other; the independency of three orifices allows a high-speed admitting orifice and a small volumes air release orifice to combine and form a "macro-inject and micro-exhaust valve" or a "high-admitting and small-vent valve", so that the valve set has the function of inhibiting the down-surge and up-surge due to column separation and rejoining cavity collapsing. The multi-function anti-surge three orifices air valve set has the function of the three orifices being independent of each other, the function of being able to be artificially turned off and then turned on, that is provided by the provision of a control isolating valve for the mid-high rate venting orifice, the function of combining the latter two functions to form a function with special effect, and the function of greatly reducing the high-rate discharge orifice.

6 Claims, 5 Drawing Sheets

(51) Int. Cl.
*F16L 55/055* (2006.01)
*F16L 55/07* (2006.01)
*F16K 24/04* (2006.01)

(56) References Cited

U.S. PATENT DOCUMENTS

| | | | | |
|---|---|---|---|---|
| 1,936,537 A | * | 11/1933 | Borden | F16K 17/19 137/202 |
| 3,168,103 A | * | 2/1965 | Kochaver | F16K 24/048 137/202 |
| 3,786,829 A | * | 1/1974 | Nardo | F16K 24/046 137/202 |
| 4,232,706 A | * | 11/1980 | Ericson | E03C 1/12 137/216.2 |
| 5,769,429 A | * | 6/1998 | Smetters | F16K 24/046 137/202 |
| 6,105,608 A | * | 8/2000 | Katzman | F16K 7/17 137/202 |
| 2009/0139581 A1 | * | 6/2009 | Herlihy | F16K 24/044 137/202 |
| 2011/0146811 A1 | * | 6/2011 | Miller | F16K 24/044 137/409 |
| 2012/0216879 A1 | * | 8/2012 | Heimann | E03B 7/075 137/202 |

\* cited by examiner

FOUR-FUNCTION ANTI-WATER HAMMER AIR VALVE SET

BACKGROUND OF THE PRESENT INVENTION

1. Field of Invention

The present invention relates to an air valve, and more particularly to a multifunctional combination air valve set having three individual orifices and one specific combined function of two of the three independent functions, wherein the independent functions are mid-high rate air vent/admitting (also), high-rate air admitting, and small volumes air release. The unique function is a combination of high-rate air admitting and small volumes air release for substantially dissipation or preventing the down-surge caused by column-separation from occurrence.

2. Description of Related Arts

The conventional combination air release valve usually has a common orifice for both high-rate air venting and high-rate air admitting which does not provide different orifices for air venting and air admitting respectively, which means lacking of independence for both functions. On the other hand, a conventional high-rate air venting orifice usually has a large diameter relatively to the required, while a conventional high-rate air admitting orifice has a smaller diameter relatively to the required and inadequate for air admitting capacity, which might contribute to development of high negative pressure (vacuum). A conventional small volumes release orifice has a relatively small diameter which is normally just 1.6 mm to 4.0 mm, and cannot satisfy the releasing requirement for large diameter pipeline.

When an empty pipeline or container is being filled with water/fluid, the air inside is rapidly discharged through a high-rate large orifice which develops a substantial differential pressure between the upstream and downstream of the orifice (or across the orifice). When this differential pressure reaches a range between 2 kPa and 3 kPa, the float working as the disc of the conventional air valve may be blown-shut to close the orifice by high rate stream around it so as to premature stopping further high-rate air discharge from the pipeline or the container. The consequence is that a substantial amount of air is trapped and remained so that incoming fluid, such as water, is prevented from further flowing into the pipeline or the container, and it cannot be full filled actually. This substantially lowers the conveyance capacity and the performance of the pipeline, and the power efficiency to operate the pipeline. The above-mentioned phenomenon also causes the problems of unstable pressure, elevated risk of corrosion on the part of the pipeline, operation cost increasing and calculation/metering errors in assigning system parameters.

Moreover, when the mid-high rate air venting/admitting orifice of the conventional combination air valve is premature blown shut (closure) by high speed air stream, air trapped in the pipeline or the container may be released through the small orifice, but the entire process requires a prolonged period of time. As a result, it may take a prolonged period of time for initial filling of water in a pipeline system or a container, and this substantially affects the efficiency of the entire pipeline system. This problem worsens when the pipeline system locates in high latitude area where summer is very short.

In order to minimize the differential pressure across the mid-high rate air venting/admitting orifice, a diameter of the orifice thereof is typically designed to be as large as possible. However, as mentioned previously, the same orifice is typically used for mid-high rate air venting and high-rate air admitting. As a result, in order to simultaneously satisfy the requirement of high-rate air admitting and high-rate air venting, the diameter of the high-speed exhaust orifice is typically designed to be larger than what is actually required. The consequence is: although the differential pressure across the mid-high rate air vebting orifice is lowered, the rate at which water flows into the pipeline or the container (initial filling) is accordingly increased, because of the lowering the back-pressure exerted on the front face of filling water column which were developed by the flowing air remained in the system (pipeline or container). If the filling flow rate of the water during the last minutes of the system is too high, the float disc of the combination air valve will be buoyed up hydraulically too quickly to close the high rate air venting orifice and sudden stop the water flowing in the pipeline or the container. Such a sudden stop of the water flow velocity causes a very high transient pressure to be developed upstream the high rate air venting orifice and eventually causes air valve slam and subsequent up-surge (positive water hammer, $\Delta h = a^* \Delta V/g$, surge pressure $\Delta h$ is proportional to rate of change of flow rate $\Delta V$). This water hammer may eventually damage the pipeline and this is actually the most significant cause of pipeline damages: it is not that the diameter of the mid-high rate air venting orifice is too small for air discharge during filling. On the contrary, the diameter of the mid-high rate air venting orifice is too large. Thus, a dynamically controlled mid-high rate air venting valve is capable of providing an optimal back-pressure and fluid filling rate, and, at the same time avoiding air valve slam and the development of water hammer due to the sudden stopping of fluid flow by the float disc at the last minutes of the system filling.

SUMMARY OF THE PRESENT INVENTION

An objective of the present invention is to provide a multifunctional anti-surge three orifices air valve set having three individual orifices/functions and one unique combined functions of two of the three independent functions, wherein the independent functions are mid-high rate air venting/admitting (also), high-rate air admitting, and small volumes air release. The unique combined function is a combination of high-rate air admitting and small volumes air release. Moreover, the three independent functions may be selectively combined so as to meet a wide variety of pipeline aeration at/during two critical periods such as initial filling, draining for empting, as well as during operation, especially when tackling the problem of negative-surge (down-surge) in a particular pipeline system.

In one aspect of the present invention, it provides a multifunctional anti-surge three orifices air valve set for a water pipeline or a container, comprising a mid-high rate air venting/admitting orifice controlled by a individual control isolating valve, a high-rate air admitting orifice independently provided from the mid-high rate air venting/admitting orifice so as to allow individual design and selection for simultaneously satisfying different diameters and rates requirements of mid-high rate air venting and high-rate air admitting, wherein the multifunctional anti-surge three orifices air valve set comprises:

a. a mid-high rate air venting/admitting valve which is positioned on a top portion of a negative pressure air admitting valve (also named vacuum breaker), and is connected to the negative pressure air admitting valve through a central guiding/aeration tube and the individual control isolating valve, wherein the mid-high rate air venting/admitting valve comprises a valve body, a valve cover, a first float disc and a mid-high rate air venting/admitting orifice, wherein during the initial empty water pipeline being filled with water, the mid-high rate air venting orifice provides an optimal (not too less or not too large) air exhaust capacity and controls a rate of water filling into the water pipeline so as to allow optimal water filling rate of the water pipeline which is the critical to the system operation, wherein the an engineer may select a suitable diameter of the mid-high rate air venting orifice;

b. a negative pressure air admitting valve (vacuum break valve) which comprises a valve body, a valve cover and a high speed air admitting orifice, an adjustment spring and an admitting valve disc, wherein when a negative pressure (vacuum) is developed in the water pipeline, the negative pressure is arranged to drive the admitting valve disc to move upwardly so as to cause the air admitting orifice to open and allows air to rapidly enter the system through the air admitting orifice for substantially relieving the vacuum (negative pressure) in the water pipeline, wherein the an engineer may select a suitable diameter of the high-rate air admitting orifice based on the independence; and c. a small volumes air release valve which is mounted on the top portion of the negative pressure air admitting valve, and comprises a valve body, a valve cover, a second float ball, a lever assembly and a small volumes air release orifice, wherein air released from the water or trapped during filling is allowed to be accumulated nearing the apex and discharged out of the pipeline system through the small volumes air release orifice.

According to recognized engineering standards that a water flow rate of an initial water filling of the water pipeline is recommended to be approximately 1 foot/s=0.3 m/s, the multifunctional anti-surge three orifices air valve set (independent orifices and anti-blown shut float ball disc) minimizes a diameter of the mid-high rate air venting orifice so as to minimize an overall size of the mid-high rate air venting/admitting valve.

The mid-high rate air venting/admitting valve comprises a first float ball (part of a valve discs), and a guiding rod connected to the first float ball to allow the first float ball to move freely upstream the mid-high rate air venting/admitting orifice, wherein the anti-blown shut characteristic of the first float ball to allow an optimal air pressure to be developed across the orifice, and subsequent, back-pressure developed in the water pipeline downstream the filling water column for controllably slowing down a rate at which the water pipeline is filled with water, so as to ensure that the water pipeline is not filled too slowly, nor too fast which may cause air valve sudden closure surges (air slam and up-surge) at the last critical minutes of filling.

When the individual control isolating valve is manually closed after the initial filling completion, and the water columns rejoin after separation during transient period, the air admitted by the air valve set during vacuum period is prevented from being rapidly discharged out of the water pipeline, instead, the air is arranged to be discharged out of the water pipeline at a relatively slow rate through the small volumes air release valve (very small orifice), so that a large part of air remains in the water pipeline to form a temporary air cushion for mitigating the surge pressure arising from rejoining of water columns and minimizing the magnitude of surges in the water pipeline, a ratio of the diameter of the air admitting orifice to that of the small volumes air release orifice is approximately 2:1 to 200:1, while a ratio of orifice passage area of the air admitting orifice to that of the small volumes air release orifice is approximately 4:1 to 40000:1.

The multifunctional anti-surge three orifices air valve set provides three individual orifices having three different parameters to satisfy all the aeration requirements of the pipeline system, wherein the multifunctional anti-surge three orifices air valve set have three different functions, each of which may be independently performed or combined in different variations.

The small volumes air release valve has a small diameter air venting orifice having a diameter in a range of between 1.0 mm and 25 mm.

By adjusting a nut attached to the adjustment spring or by altering a weight of the admitting valve disc, a negative pressure activation threshold is capable of being adjusted, wherein the adjustment range is preferably −90 kPa(g) to −10 kPa(g), while a negative pressure in the water pipeline is generally in a range between −3000 Pa(g) and −500 Pa(g).

The negative pressure air admitting valve is designed to face downwardly so as to prevent dust from gathering and possible entering the water pipeline through the negative pressure air admitting valve.

The multifunctional anti-surge three orifices air valve set is arranged to have an air accumulation chamber inside the main body therein so as to prevent damage of the valve set due to possible freezing. Besides, this inherent inside air chamber has the additional function of dissipating local small surges possible caused by quick closure or rude regulating of valves or other hydraulic disturbance in the pipeline system.

The multifunctional anti-surge three orifices air valve set has a plurality of dovetail slots each having an O-ring for providing double sealing composed of metal-to-metal and rubber-to-metal. Moreover, a top opening structure of the all of the multifunctional anti-surge three orifices air valve set allows easy maintenance.

When compared with conventional arts, the present invention has the following technical advantages:

1. The present invention provides three individual orifices having different parameters to satisfy different operational aeration requirements of the fluid transmission pipeline system. The present invention resolves the problem that exists in conventional arts: a conventional combination air valve does not have independent and individual mid-high rate air venting orifice and high-rate air admitting orifice, yet it has to satisfy both the requirements of mid-high rate air venting and high-rate air admitting. With the use of the present invention, engineers are allowed to select an optimal diameter of each of the mid-high rate air venting orifice and the high-rate air admitting orifice respectively.

2. According to section 7.1.2 of CECS193:2005 (Technical Specification for Long Distance Water Transmission Pipeline Engineering of Urban Water Supply) of China Engineering Construction Standardization Association Standards, the flow rate of water filling a water pipeline should be in the range of 0.3 m/s-0.5 m/s, and according to Manual M51 (Air Release, Air/Vacuum, and Combination Air Valves) published by the American Water Works Association (AWWA), the water flow rate of an initial water filling of a water pipeline is recommended to be approximately 1 foot/s=0.3 m/s, the present invention minimizes the diameter of mid-high rate air venting orifice so as to minimize the overall size of the mid-high rate air venting valve.

3. Utilizing simple aerodynamic principles, the mid-high rate air venting orifice will not be blown shut by high speed air stream so as to allow an optimal air pressure to be developed in the water pipeline for controllably slowing down the rate at which the water pipeline is filled, so as to ensure that the water pipeline is not filled too slowly, nor too fast which may cause air valve closure surges (air valve slam) at the last minutes of filling.

4. When initial filling of the water pipeline is completed, the individual manual control valve locating upstream or downstream of the mid-high venting orifice can be closed manually without affecting high-rate air admitting function (if the manual valve does not need to be closed, the control isolating valve can be omitted from the multifunctional anti-surge three orifices air valve set). When water columns separation and consequent rejoining occurs, a temporary air cushion is formed in a local position around the apex where the air valve set locates so as to dissipate the down-surge and the subsequent rejoining up-surge by absorbing and cushioning the energy of the columns rejoining impacting. The manual valve can be a ball valve, a gate valve, a globe valve, a butterfly valve or a regulating valve etc, locating either upstream or down-stream of the venting orifice.

5. The present invention allows the small volumes air release orifice to have a many diameters, such as 1.6 mm, 2.4 mm, 3.2 mm, 4.8 mm, 5.6 mm, 6.4 mm, 8.0 mm, 9.5 mm, and 12.7 mm, 25 mm etc. A user of the present invention may select the most optimal diameter of the small volumes air release orifice so as to ensure the water pipeline or the container has the adequate small-amount release capacity for increasing the overall transmission efficiency of the water pipeline system, and decreasing transmission cost. The present invention also reduces the repeat construction cost of the water pipeline system, and allows engineers to select the most optimal diameters of the various admitting and release orifices respectively so as to effectively reduce or prevent the occurrences of surges in the water pipeline system.

6. The present invention may also allow a user to adjust a negative pressure activation threshold. An adjustment spring 5 is provided on a central exhaust tube. By adjusting a nut attached to the adjustment spring 5 or by altering the weight of the admitting valve disc 8, the negative pressure activation threshold can be adjusted. The adjustment range is preferably in the range between −90 kPa(g) and −10 Pa(g), while a typical negative pressure in the water pipeline is in the range between −3000 Pa(g) and −500 Pa(g).

7. In order to prevent dust, the negative pressure air admitting valve is designed to face downward so as to prevent dust from gathering and possible entering the water pipeline through the negative pressure air admitting valve if it opens.

8. The present invention provides an inherent chamber for air trapping and accumulating therein so as to prevent freezing damage and possible local small surges. The small volumes air release orifice is connected at a lower point underneath the cover top of the negative pressure air admitting valve so as to allow a predetermined amount of air to be trapped and accumulated inside the main body. This inside air chamber structure inherently prevents the multifunctional anti-surge three orifices air valve set of the present invention from being damaged by possible freezing due to low temperature, and possible small local surges caused by valve closure or rude regulation in the system.

9. The multifunctional anti-surge three orifices air valve set has a plurality of dovetail slots each having an O-ring for providing double sealing composed of metal-to-metal and rubber-to-metal, which can realize both low pressure and middle pressure sealing.

10. All of the important components of the present invention are mainly provided under the top cover of the negative pressure admitting valve so as to be accessible and allow easy maintenance of the present invention when the top cover is opened.

DETAILED DESCRIPTION OF THE PREFERRED EMBODIMENT

Figure 1:
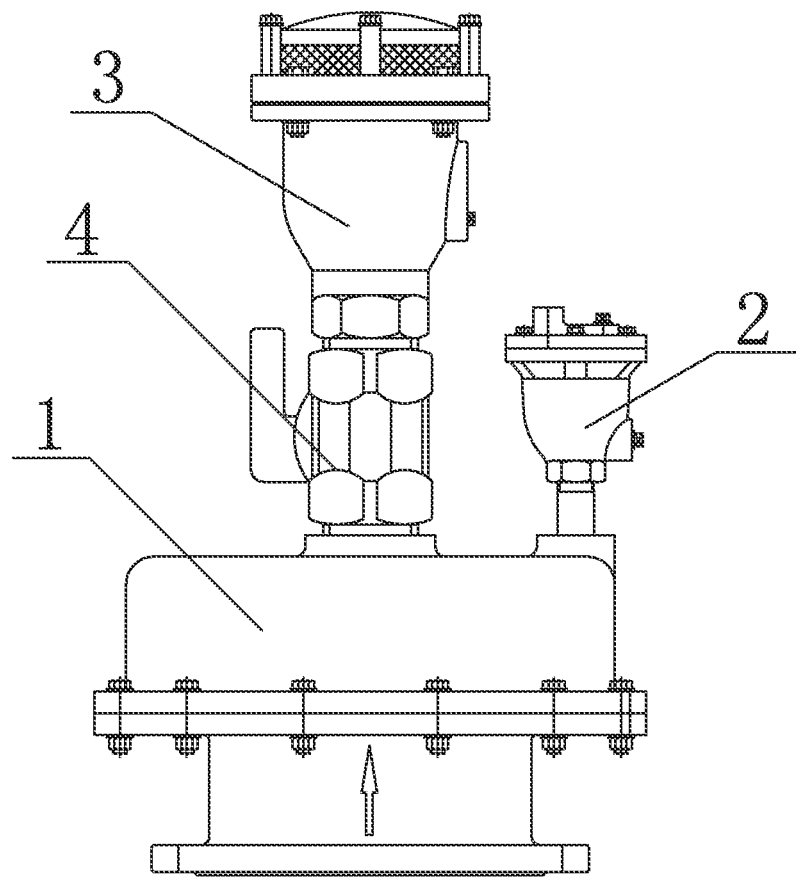
FIG. 1 is a schematic diagram of a multifunction anti-surge three orifices air valve set according to a first preferred embodiment of the present invention.
Figure 2:
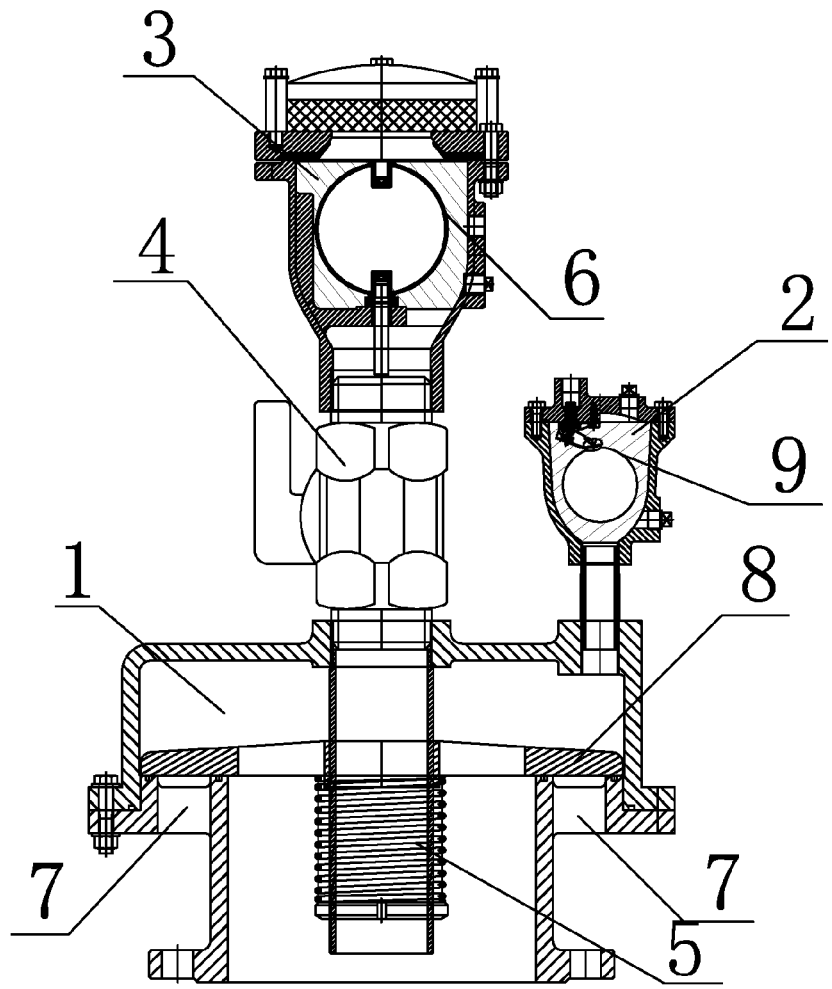
FIG. 2 is a sectional side view schematic illustration of the multifunction anti-surge air valve set according to the first preferred embodiment of the present invention.
Figure 3:
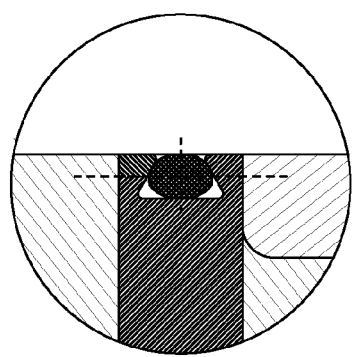
FIG. 3 is a sectional side view schematic illustration of a dovetail slot of the multifunction anti-surge air valve set according to the first preferred embodiment of the present invention.

The following detailed description of the preferred embodiment is the preferred mode of carrying out the invention, and is described in conjunction with FIG. 1, FIG. 2 and FIG. 3 of the drawings.

A multifunctional anti-surge three orifices air valve set (which can also be termed independent multifunctional 3 orifices combination air valve) comprises a negative pressure air admitting valve 1 (vacuum breaker), a small volumes air release valve 2, a mid-high rate air venting/admitting valve 3, and an individual control isolating valve 4 (Also, this manual control valve can be designed locating inside and downstream of the mid-high release orifice). The mid-high rate venting valve 3 is connected to a top portion of the negative pressure admitting valve 1 through the central aeration tube and the control isolating valve 4. The negative pressure admitting valve 1 is connected to a T-connector of a water pipeline. The small volumes release valve 2 is connected to a low position of the top cover of the negative pressure admitting valve 1 (Also, if the manual control valve locates downstream of the mid-high release orifice, this small release valve can be connected on the body side of the venting valve 3, but up-stream of the manual control valve).

Embodiment 1: referring to FIG. 2 of the drawings, when the empty water pipeline is being filled with water for the first time, water flows along the water pipeline and develops air pressure in the water pipeline. The air in the water pipeline is then guided to flow out of the water pipeline through a central guiding (aeration) tube inside the negative pressure air admitting valve 1, the control isolating valve 4, and a mid-high rate venting orifice. Utilizing simple aerodynamic principles, a first float ball 6 of the mid-high rate venting valve 3 is arranged to withstand an air differential pressure of approximately 35 kPa to 89 kPa. Thus, when the air pressure in the water pipeline (also working as the back-pressure of the filling column) is within this range, the first float ball 6 is kept suspending, and not be blown shut. (when the air pressure reaches 89 kPa and above, the first float ball still not be blown shut to end the large amount air venting of the water pipeline, though water filling for a normal water pipeline condition does not generally reach this high level of air pressure). As a result, when water is flowing along the water pipeline, the air differential pressure across the venting orifice (that is close to the back pressure of filling water column) can be controlled within a predetermined range (usually less than 35 kPa). The development of this air differential pressure causes a resistance (back-pressure) to the forwarding flow of the filling water in the water pipeline, and this resistance lowers the forwarding flow speed of the filling water column (usually less than 0.3 m/s). The combination of these characteristics achieve low speed water filling, and minimize the potential magnitude of possible surges caused by the middle air orifice closure (air slam) at the last stage of filling. For some locations of the water pipeline where water column rejoining is deemed to occur frequently, after the water pipeline is completely filled with water, the control isolating valve 4 may be manually closed (so as to turn the multifunctional anti-surge three orifices air valve set of the present invention to form a "combination of high suction and small venting air valve" or a "combination of macro suction and micro release air valve" having un-balanced bi-directional aeration capacity). When a second water filling is needed for the water pipeline, the control isolating valve 4 may be opened again. According to section 7.1.2 of CECS193:2005 (Technical Specification for Long Distance Water Transmission Pipeline Engineering of Urban Water Supply) of China Engineering Construction Standardization Association Standards, the flow rate of water filling a water pipeline should be in the range of 0.3 m/s-0.5 m/s, and according to Manual M51 (Air Release, Air/Vacuum, and Combination Air Valves) published by the American Water Works Association (AWWA), the water flow rate of an initial water filling of a water pipeline is recommended to be approximately 1 foot/s=0.3 m/s, the present invention (individual orifices and anti-blown shut characteristic) minimizes the diameter of small mid-high rate air venting orifice so as to minimize the overall size of the mid-high rate air venting valve 3. As mentioned earlier, a conventional combination air valve does not have independent and individual mid-high rate air venting orifice and high-rate air admitting orifice, yet it has to satisfy the aeration requirement of both mid-high rate air venting and high-rate air admitting. A diameter requirement of the high-rate air admitting orifice is usually quite greater than that of the mid-high rate air venting orifice. This is a deep-seated problem which has not been resolved by engineers for many years. With the use of the present invention, engineers are allowed to select an optimal diameter of each of the mid-high rate air venting orifice and the high-rate air admitting orifice respectively.

Embodiment 2: referring to FIG. 2 of the drawings, when the pipeline is full of water, and is in normal operation, the water is flowing along it, the air released from flowing water or trapped and remained during the filling, or from other source, is allowed to be discharged therefrom through the small volumes air release orifice. Such these released air is then guided to flow into a/the body chamber defined by the small volumes air release valve 2. When air enters the chamber of the small volumes air release valve 2, water level in the chamber decreases. When the water level decreases below a second float ball 9 provided in the chamber, the second float ball 9 is arranged to drive a lever assembly provided in the small volumes air release valve 2 so as to selectively and controllably open the small volumes air release orifice for occasionally and repeatedly discharge the air in the chamber of the small volumes air release valve 2. The small volumes air release valve 2 comprises a single lever assembly or a compound lever assembly, wherein the compound lever assembly is arranged to substantially (by few times to more than ten times) amplify the mass of the second float ball 9 (that is, the extent of pressure to which the small volumes air release orifice opens) so as to increase the working pressure of the small volumes air release orifice or the orifice diameter (that is, a air discharge flow rate), and to allow selection of different diameters of the small volumes air release orifice, such as 1.6 mm, 2.4 mm, 3.2 mm, 4.8 mm, 5.6 mm, 9.5 mm, and 12.7 mm etc. The maximum diameter may be 25 mm. A user of the present invention may select the most optimal diameter of the small volumes air release orifice so as to ensure the water pipeline or the container has the adequate small amount air release capacity for increasing the overall transmission efficiency of the water pipeline system, and decreasing transmission loss/cost. The present invention also reduces the repeat construction cost of the water pipeline system, and allows engineers to select the most optimal diameters of the various admitting and venting orifices so as to effectively reduce or prevent the occurrences of water hammer in the water pipeline system.

Embodiment 3: referring to FIG. 2 of the drawings, when the pumps of a water pipeline system suddenly stop, or a valve be suddenly closed, or pipeline burst occurs, there may be the occurrence of water column separation of in the water pipeline, causing vacuum effect (negative pressure) in some apexes or summit locations in the pipeline. When this occurs, the air pressure within the water pipeline is lower than that of the atmosphere. This differential pressure causes an admitting valve disc 8 of the negative pressure air admitting valve 1 to move up to open the admitting orifice 7 and allows air to rapidly enter the water pipeline through the air admitting orifice 7. When air enters the water pipeline, the negative pressure (vacuum) in the water pipeline is relieved so as to ensure the overall safety of the entire water pipeline system. A user may also select the most suitable or optimal diameter of the air admitting orifice 7 so as to meet different operational requirements for aeration of the present invention (generally speaking, the larger the better).

Embodiment 4: referring to FIG. 2 of the drawings, when the water columns in the water pipeline return to rejoin due to pump driving or gravity force or inertia force, the large amount admitted air still remains inside the system, and cannot be rapidly discharged out of the water pipeline because the mid-high venting orifice has been manually closed by the control isolating valve 4, after finishing the filling. Rather, the air can only be discharged out of the water pipeline at a relatively slow rate through the small volumes air release valve (very small orifice). A large part of air will remain in the water pipeline during this rejoining process (severe transient period) to form a temporary air cushion to mitigate the effect and pressure arising from rejoining of water columns so as to minimize the surge pressure due to column separation in the water pipeline. In this preferred embodiment, a ratio of the diameter of the air admitting orifice to that of the small volumes air release orifice is approximately 2:1 to 200:1, while a ratio of orifice passage area of the air admitting orifice to that of the small volumes air release orifice is approximately 4:1 to 40000:1. Preferably, when the above mentioned orifice passage area ratio reaches higher than 25:1 (equivalent to a diameter ratio of more than 5:1), the present invention is optimally designed to dissipate or prevent this kind of down-surge due to column separation.

Embodiment 5: referring to FIG. 2 of the drawings, the present invention may also allow a user to adjust a negative pressure activation threshold. An adjustment spring 5 is provided on a central guiding/aeration tube. By adjusting a nut attached to the adjustment spring 5 or by altering the weight of the admitting valve disc 8, the negative pressure activation threshold can be adjusted. The adjustment range is preferably in the range between −90 kPa(g) and ±10 kPa(g), while a typical negative pressure in the water pipeline is in the range between −3000 Pa(g) and −500 Pa(g). Different negative pressure activation threshold may require adjustment spring 5 of different elasticity or admitting valve disc 8 of different weights.

Embodiment 6: referring to FIG. 2 of the drawings, in order to prevent dust, the negative pressure air admitting valve 1 is designed to face downward so as to prevent dust from gathering and entering the water pipeline through the negative pressure air admitting valve 1.

Embodiment 7: referring to FIG. 2 of the drawings, it illustrates an embedded and inherent anti-freeze structure of the present invention. The multifunctional anti-surge three orifices air valve set of the present invention is arranged to have inside air chamber therein so as to prevent freezing damage of the valve set. The connection point of small volumes air release orifice is positioned underneath the negative pressure air admitting valve 1 which is lower than the top of cover, so as to allow a predetermined amount of air to be trapped and accumulated inside the main valve 1 body. This inherent air chamber structure prevents the multifunctional anti-surge three orifices air valve set of the present invention from being damaged by low temperature, and potential local small surges caused by local small disturbance, such as the air valve itself slam at the last stage of filling.

Embodiment 8: referring to FIG. 3 of the drawings, the multifunctional anti-surge three orifices air valve set has a plurality of dovetail slots each having an O-ring for providing double sealing function composed of metal-to-metal and rubber-to-metal, which can realize both low pressure and middle pressure sealing.

Embodiment 9: referring to FIG. 1 to FIG. 2 of the drawings, all of the important components of the present invention are mainly provided under the top cover of the negative pressure admitting valve 1 so as to be accessible and allow easy maintenance of the present invention when the top cover is opened.

Embodiment 10: referring to FIG. 4 to FIG. 8 of the drawings, they illustrate different locations of the negative pressure air admitting valve 1, the small volumes air release valve 2, the mid-high rate air venting valve 3, and the control isolating valve 4.

Figure 4:
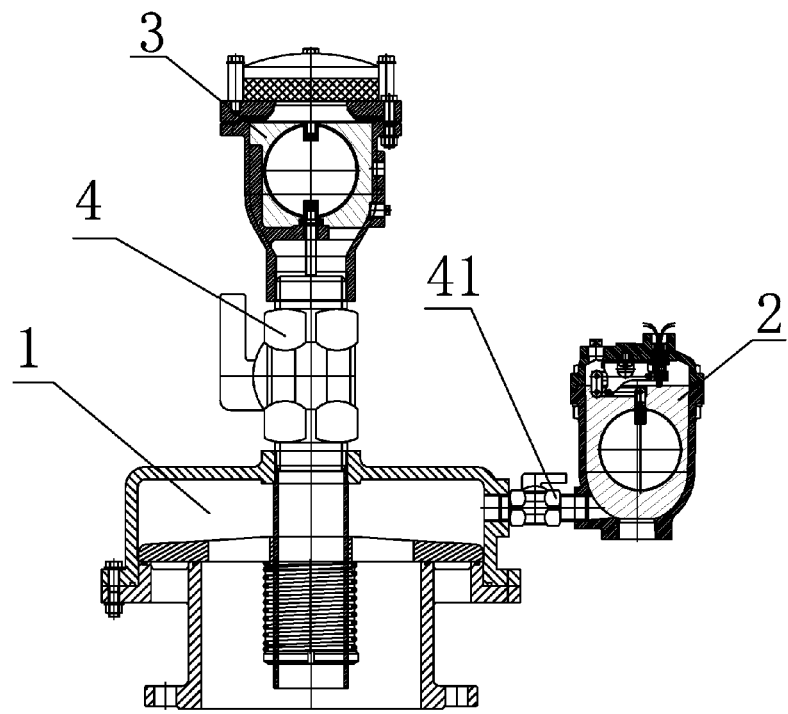
FIG. 4 is a sectional side view schematic illustration of the multifunction anti-surge air valve set according to a second preferred embodiment of the present invention.

As shown in FIG. 4 of the drawings, the small volumes air release valve 2 is mounted to the negative pressure air admitting valve 1 at one side thereof through a manual valve 41.

Figure 5:
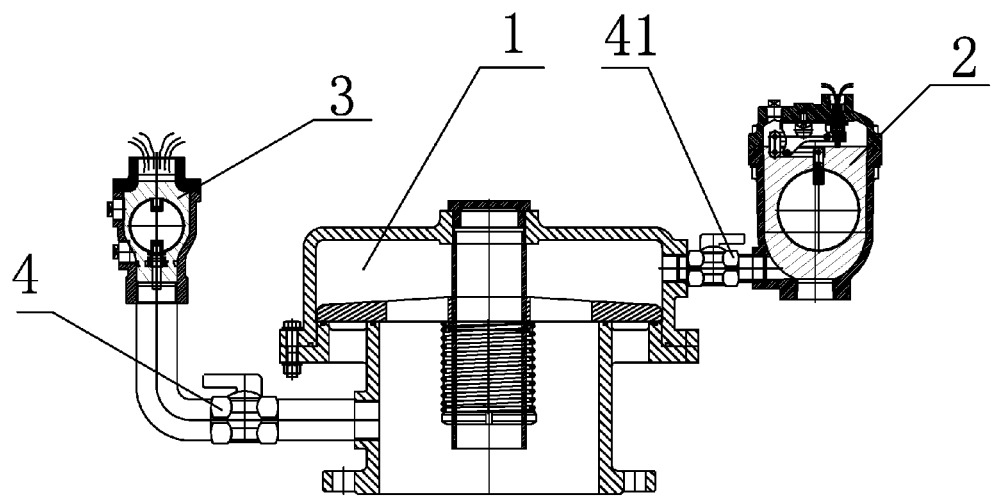
FIG. 5 is a sectional side view schematic illustration of the multifunction anti-surge air valve set according to a third preferred embodiment of the present invention.

As shown in FIG. 5 of the drawings, the mid-high rate air venting valve 3 and the small volumes air release valve 2 are connected to two sides of the negative pressure air admitting valve 1 via two manual valves 4 and 41 respectively.

Figure 6:
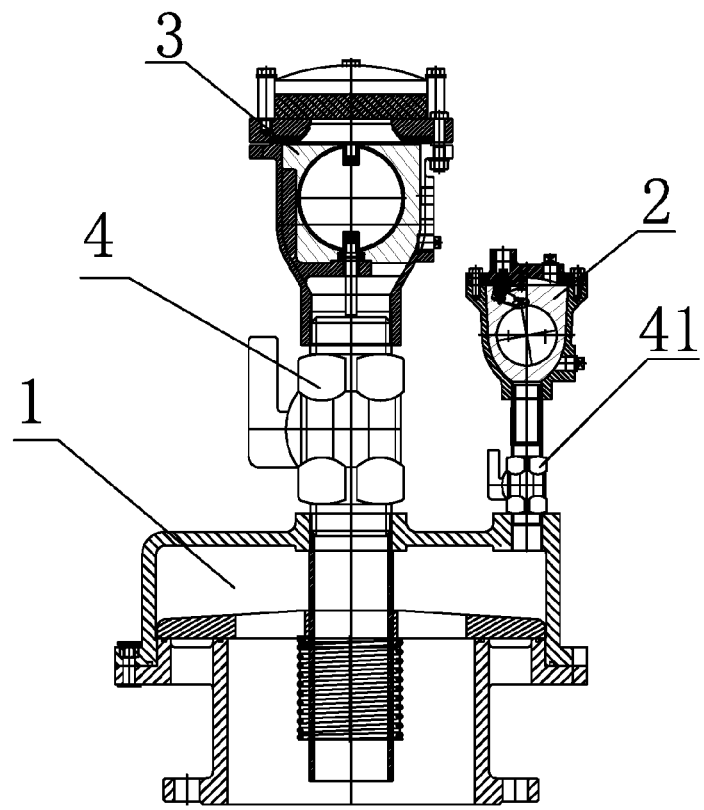
FIG. 6 is a sectional side view schematic illustration of the multifunction anti-surge air valve set according to a fourth preferred embodiment of the present invention.

As shown in FIG. 6 of the drawings, the mid-high rate air venting valve 3 and the control isolating valve 4 are provided on top of the negative pressure air admitting valve 1 while the small volumes air release valve 2 is connected to a top cover of the negative pressure air admitting valve 1 through the manual valve 41. Additional, if the manual control valve 4 be designed locating at the top of the mid-size venting orifice 3 (down-stream or terminal of the mid-high air venting passage), the air release valve 2 can also be amounted on the body side of mid-high venting valve 3.

Figure 7:
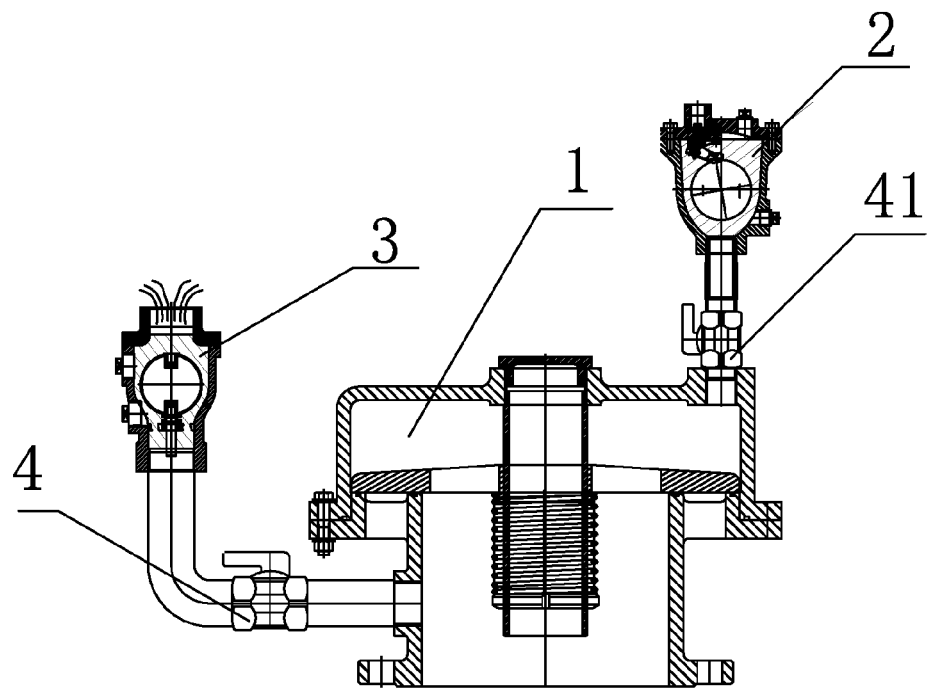
FIG. 7 is a sectional side view schematic illustration of the multifunction anti-surge air valve set according to a fifth preferred embodiment of the present invention.

As shown in FIG. 7 of the drawings, the mid-high rate air venting valve 3 and the control isolating valve 4 are connected to two sides of the negative pressure air admitting valve 1 respectively while the small volumes air release valve 2 is connected to a top cover of the negative pressure air admitting valve 1 through the manual valve 41.

Figure 8:
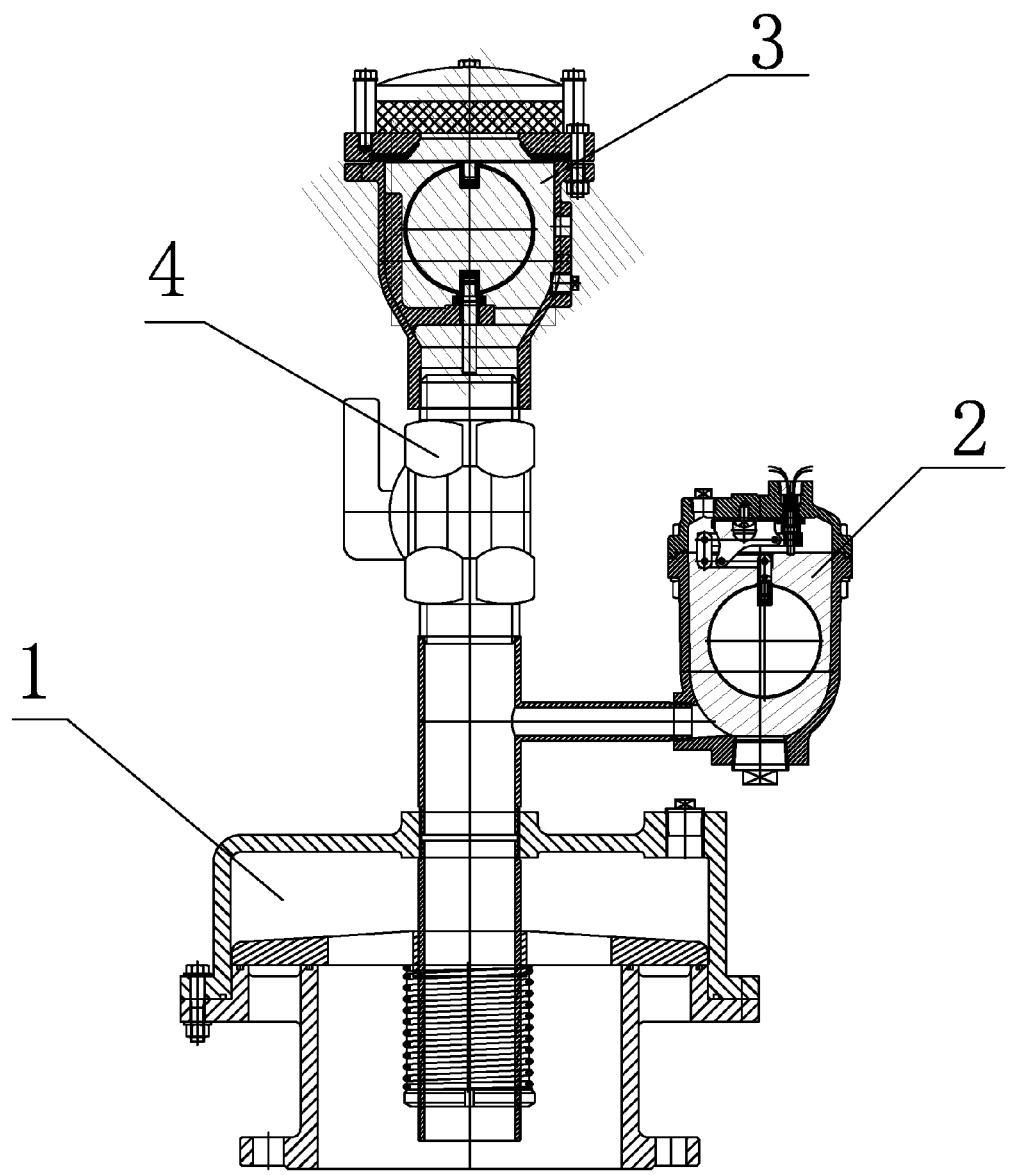
FIG. 8 is a sectional side view schematic illustration of the multifunction anti-surge air valve set according to a sixth preferred embodiment of the present invention.

As shown in FIG. 8 of the drawings, the mid-high rate air venting valve 3 and the control isolating valve 4 are connected to the top portion of the negative pressure air admitting valve 1, while the small volumes air release valve 2 is connected to the central discharge tube, and upstream of the manual control valve 4, as well the mid-high rate air venting valve 3.

What is claimed is:

1. A multifunctional anti-surge air valve set, comprising:
   a negative pressure air intake valve which comprises a valve body, a valve cover provided on said valve body, a high speed air intake orifice formed on said valve body of said negative pressure air intake valve and facing downwardly thereof, an adjustment spring provided in said valve body of said negative pressure air intake valve, and an intake valve disc movably provided in said valve body of said negative pressure air intake valve at a position above said high speed air intake orifice, wherein when a negative pressure is developed in said valve body of said negative pressure air intake valve, said negative pressure is arranged to drive said intake valve disc to move upwardly so as to open said air intake orifice for allowing air to rapidly enter said negative pressure air intake valve through said air intake orifice;
   a control isolating valve provided on a top portion of said negative pressure intake valve;
   a mid-high rate air release valve which is mounted on a top portion of said control isolating valve, and comprises a valve body, a valve cover provided on said valve body of said mid-high rate air release valve, a first float ball movably provided in said valve body, a mid-high rate air release orifice provided on said valve body of said mid-high rate air release valve for allowing air in said valve body to be discharged out of said mid-high rate air release valve; and
   a small-amount air venting valve extended from said negative pressure air intake valve at a position spacedly apart from said control isolating valve and said mid-high rate air release valve, said small-amount air venting valve comprising a valve body, a valve cover provided on said valve body of said small-amount air venting valve, a second float ball provided in said valve body of said small-amount air venting valve, and a small-amount air venting orifice for allowing a small amount of air to be discharged.

2. The multifunctional anti-surge air valve set, as recited in claim 1, wherein said mid-high rate air release valve further comprises a guiding rod connected to said first float ball to guide said first float ball for selectively closing and opening said mid-high rate air release orifice, said first float ball being arranged in suspended open position under high-speed air flow stream.

3. The multifunctional anti-surge air valve set, as recited in claim 2, wherein said control isolating valve is configured to be selectively turned off for guiding residual air to be discharged through said small-amount air venting valve at a predetermined discharge rate, a ratio of a diameter of said air intake orifice to that of said small-amount air venting orifice being approximately 2:1 to 200:1, a ratio of an orifice passage area of said air intake orifice to that of said small-amount air venting orifice being approximately 4:1 to 40000:1.

4. The multifunctional anti-surge air valve set, as recited in claim 3, wherein said small-amount air venting orifice has a diameter in a range between approximately 1.0 mm and approximately 12.7 mm.

5. The multifunctional anti-surge air valve set, as recited in claim 4, wherein said negative pressure intake valve further comprises a nut adjustably attached to said adjustment spring for adjusting a negative pressure activation threshold thereof, said negative pressure activation threshold being in a range between approximately −90 kPa and approximately −10 kPa.

6. The multifunctional anti-surge air valve set, as recited in claim 5, further comprising a plurality of dovetail slots and a plurality of O-rings received in said dovetail slots.

\* \* \* \* \*